(12) United States Patent
Papera

(10) Patent No.: US 6,293,426 B1
(45) Date of Patent: Sep. 25, 2001

(54) METHOD FOR OFF-LOADING INCOHERENT MATERIAL FROM A CONTAINER AND APPARATUS FOR THE IMPLEMENTATION OF THE METHOD

(75) Inventor: Carlo Papera, Segromigno Monte (IT)

(73) Assignee: Zanchetta & C. S.r.l. (IT)

( * ) Notice: Subject to any disclaimer, the term of this patent is extended or adjusted under 35 U.S.C. 154(b) by 0 days.

(21) Appl. No.: 09/458,480

(22) Filed: Dec. 9, 1999

(30) Foreign Application Priority Data

Mar. 29, 1999 (IT) .............................................. BO99A0147

(51) Int. Cl.$^7$ ........................................................ B67D 5/06
(52) U.S. Cl. .............................. 222/1; 222/207; 222/212; 222/214; 222/181.2; 141/287
(58) Field of Search .................................. 22/1, 207, 212, 22/214, 215, 181.2; 141/287

(56) References Cited

U.S. PATENT DOCUMENTS

| | | | |
|---|---|---|---|
| 2,926,614 | * | 3/1960 | Rose, Jr. ............................ 222/214 X |
| 3,359,916 | * | 12/1967 | Houston et al. ...................... 417/246 |
| 3,568,733 | * | 3/1971 | Lau et al. ........................... 222/207 X |
| 4,182,386 | * | 1/1980 | Alack ............................... 222/195 X |
| 4,484,698 | * | 11/1984 | Starr ............................... 222/214 X |
| 4,703,782 | * | 11/1987 | Henkel, Sr. ......................... 141/287 X |
| 5,105,981 | * | 4/1992 | Gehman ............................. 222/1 |
| 5,265,654 | * | 11/1993 | Larsen ............................. 141/287 X |

FOREIGN PATENT DOCUMENTS

| | | |
|---|---|---|
| 28 17 337 | 10/1978 | (DE) . |
| 686588 | 12/1995 | (EP) . |
| 810170 | 12/1997 | (EP) . |
| 1265286 | 10/1961 | (FR) . |

* cited by examiner

*Primary Examiner*—Kenneth Bomberg
(74) *Attorney, Agent, or Firm*—Fay Sharpe Fagan Minnich & McKee, LLP

(57) ABSTRACT

Method and apparatus for off-loading incoherent material from a container towards a user unit positioned inferiorly to the container itself, wherein the phases are implemented of connecting an outlet of the container to a superior extremity of a conduit connected with its other extremity to the user unit, to the outlet being associated a valve element and to the conduit being associated a plurality of shut-off elements mutually distanced along the conduit itself and each able to vary the amplitude of the passage existing inside the conduit itself between a condition of closure of the passage and a condition of maximum opening; placing all shut-off elements in the closure condition; causing the opening of the valve element; and of causing the progressive disposition of the shut-off elements, starting from the highest one and proceeding downward, from the closure condition to the maximum opening condition.

10 Claims, 5 Drawing Sheets

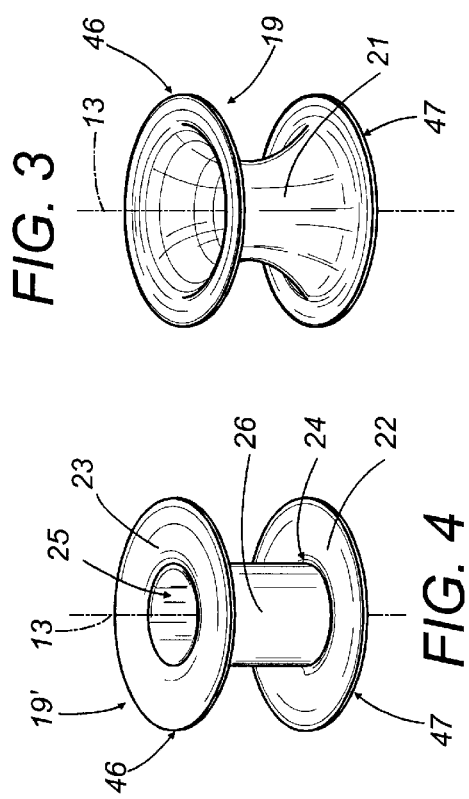
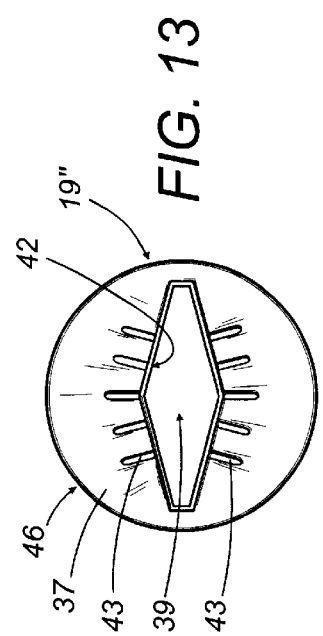
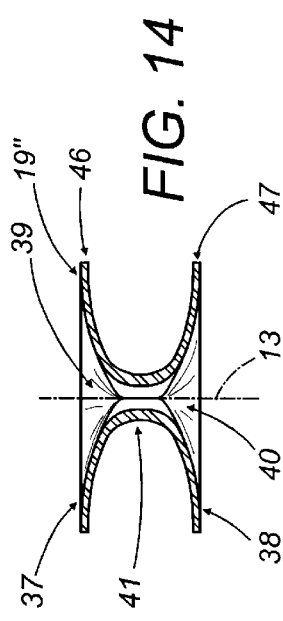
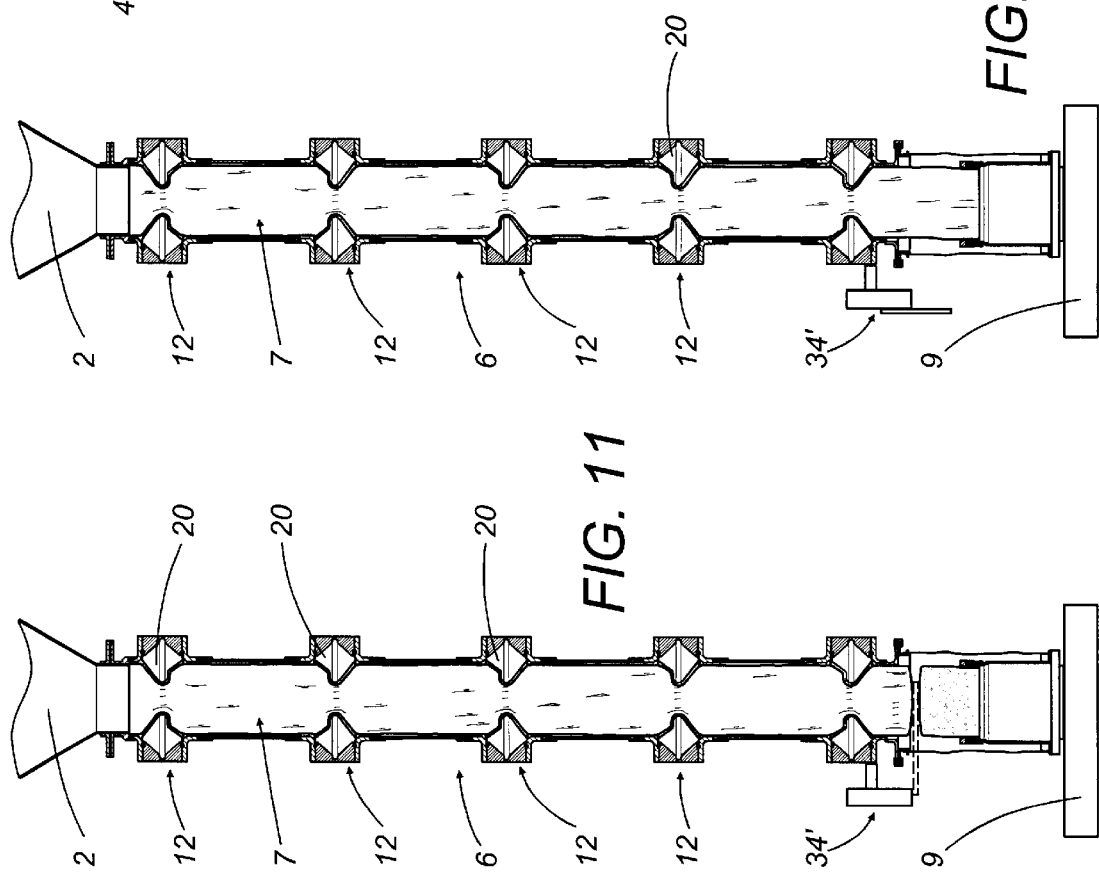

METHOD FOR OFF-LOADING INCOHERENT MATERIAL FROM A CONTAINER AND APPARATUS FOR THE IMPLEMENTATION OF THE METHOD

BACKGROUND OF THE INVENTION

The present invention relates to a method and a related apparatus for off-loading incoherent material from a container. The subject apparatus is usable, in particular, in the chemical and/or pharmaceutical industry and wherever containers housing in their interior incoherent material constituted by dusts, fine-grain granulates or similar products need to be off-loaded.

Such containers are emptied in correspondence with an off-loading station, wherefrom the material housed therein is transferred towards a collecting tank or a collector connected, for instance, to a machine that uses the incoherent material itself for subsequent work processes. The collecting tank is positioned at a given level, and thereon is provided a support structure able to allow the positioning of a container at another level, higher than the previous one, thereby allowing the emptying of the container itself by gravity.

To allow the material to flow out of the superior container into the inferior container, connecting means are provided between the two levels, constituted by a rigid cylindrical conduit positioned vertically, within which a tubular sack is coaxially inserted, such sack presenting its own extremities respectively connected to the discharge outlet of the container and to the loading outlet of the tank or hopper.

The container is emptied by the passage of the dust contained therein through the tubular sack, which must be connected in substantially hermetic manner to the container and to the hopper so as not to let the dust exit: in practice, the dispersion of the dusts into the environment needs to be contained as much as possible.

For the closure of the tubular sack, as for the closure of the container, fastening means are used, such as bands or sealing rings, combined with controllable shut-off means such as butterfly valves and the like.

In spite of the presence of such fastening and closure means, in currently used apparatuses, a first problem relates to the possibility that dusts may be dispersed into the environment. This possibility is particularly considerable, in that the materials handled by the apparatuses in question are extremely prone to dispersion into the atmosphere due to their structure (meaning the size of the granules that compose them) and to their low specific gravity, so that the closure organs and fastening means in use may be found insufficient.

The relevance of the problem described above is all the greater the more the dusts treated in the apparatus considered above are constituted by substances or chemical compounds which are not easily degradable in the environment and, in some case, potentially harmful.

For this reason it is necessary to use tubular sacks that differ from substance to substance and thoroughly to clean the connection when shifting from one substance to another.

A further problem existing in the apparatuses considered above consists of the possibility that the dusts, during their passage from the superior container to the inferior tank through the aforementioned tubular sack, which usually presents a relatively large length (for instance on the order of two meters), de-mix. The separation of the various components constituting the dusts can easily occur, when opening the aforementioned shut-off organs, when a sizeable mass of dusts rapidly falls along the aforementioned tubular sack.

Apparatuses are known wherein, to eliminate the above drawback, the aforesaid tubular sack, or at least a considerable portion thereof, is not surrounded by the aforementioned rigid cylindrical conduit, and its superior portion, before the shut-off organs positioned at the outlet of the superior container are opened, is closed between the jaws of a "pliers element" able to slide vertically in the two directions along the tubular sack itself When the shut-off organs are opened, the mass of dust that enters into the tubular sack does not travel in a sudden manner through the sizeable gap that separates the superior container from the inferior tank, but immediately stops in correspondence with the restriction induced in the tubular sack itself by the aforesaid pliers element; this pliers element then starts to translate downwards, sliding in contact with the tubular sack and progressively opening the ever-larger portion of the tubular sack overlying it. As a consequence thereof, the tubular sack is progressively filled by the dusts, until, when the pliers element has arrived in proximity to the inferior tank, the jaws of the pliers element itself are opened and the dusts can freely start to flow towards the inferior tank.

The solution just described, while effective, is relatively complex and gives rise to considerable bulkiness of the portion of apparatus between the superior container and the inferior tank.

SUMMARY OF THE INVENTION

The aim of the present invention is to eliminate the aforementioned drawbacks.

According to the present invention, a method is provided for off-loading incoherent material from a container, for dispensing the incoherent material itself towards a user unit positioned inferiorly to the container itself, comprising the phases of connecting an outlet of said container to a superior extremity of a conduit connected with its other extremity to said user unit; to said outlet being associated a valve element and to said conduit being associated a plurality of shut-off elements mutually distanced along the conduit itself and each able to vary the amplitude of the passage existing inside the conduit itself between a condition of closure of the passage and a condition of maximum opening; of placing all shut-off elements in said closure condition; of causing the opening of said valve element; and of causing the progressive disposition of said shut-off elements, starting from the highest one and proceeding downward, from the closure condition to the maximum opening condition.

The present invention further relates to an apparatus for off-loading incoherent materials from a container.

According to the present invention, an apparatus is obtained for off-loading incoherent material from a container, for the dispensing of the incoherent material itself towards a user unit positioned inferiorly to the container itself, comprising a conduit connected with an extremity to an outlet of said container and with the other extremity to said user unit; to said outlet being associated a valve element and to said conduit being associated a plurality of shut-off elements mutually distanced along the conduit itself and each able to vary the amplitude of the passage existing inside the conduit itself between a condition of closure of the passage and a condition of maximum opening; actuating means being provided to make said shut-off elements, in use and to start dispensing said incoherent material towards said user unit, progressively shift, starting from the highest one and proceeding downwards, from said closure condition to said condition of maximum opening.

Among the advantages of the present invention is the obtainment of a connection between the container to be emptied and the tank (or hopper or the like), connection which is isolated from the surrounding environment and hence is able to prevent undesired dispersions of the dusts into the environment itself.

Moreover, the method according to the present invention allows to prevent, in a relatively simple yet extremely effective manner, any possibility that the dusts may de-mix in the course of their passage from the superior container to the inferior tank through the aforementioned tubular sack.

BRIEF DESCRIPTION OF THE DRAWINGS

The technical features of the invention can be clearly noted from the content of the claims that follow and its advantages shall become more readily apparent from the detailed description that follows, made with reference to the accompanying drawings, which represent an embodiment provided purely by way of non-limiting example, in which:

FIGS. 3 and 4 show a perspective view of two embodiments of a detail of the previous figures;

FIGS. 5 through 12 schematically show a front view, with some parts sectioned and other parts removed, of some details of the previous figures in respective different operative phases; and FIGS. 13 and 14 shows a top plan view and, respectively according to a cross section, an alternative embodiment of the detail shown in FIGS. 3 and 4.

DESCRIPTION OF THE PREFERRED EMBODIMENTS

Figure 1:
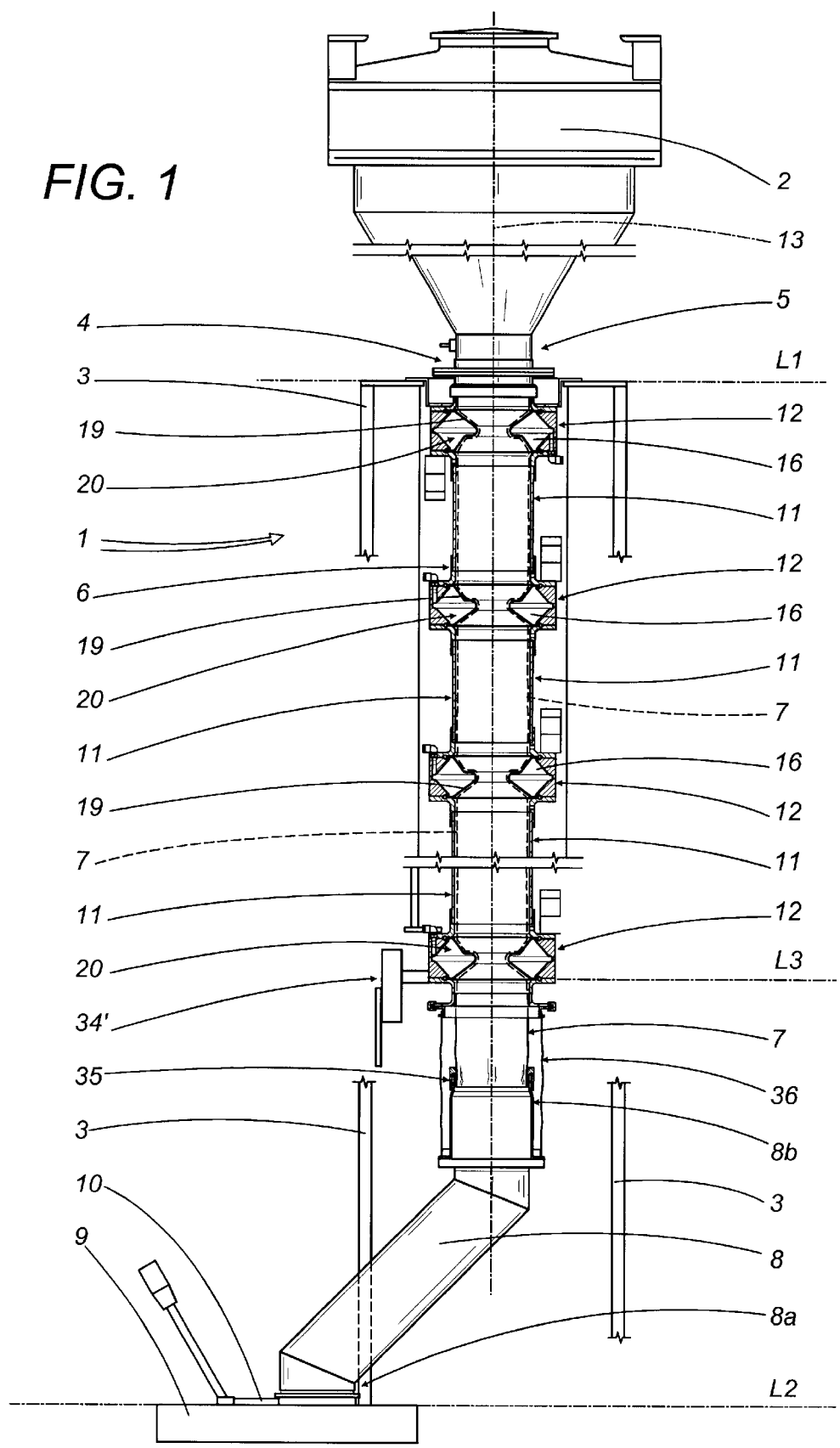
FIG. 1 schematically shows, in an overall front view, a possible embodiment of an apparatus obtained in accordance with the present invention.

With reference to FIG. 1, the number 1 indicates in its entirety an apparatus usable for off-loading incoherent material from a container 2.

In the illustrated embodiment, the apparatus 1 comprises a structure 3 positioned substantially vertical, shown only in part and schematically in FIG. 1 and presenting a first upper level L1 and a second lower level L2.

This structure 3 simulates, in practice, a difference in height between the two levels, and the structure 3 is meant to represent schematically all those situations wherein a raised plane supporting a container is present, along with a collecting tank positioned at a lower plane.

In correspondence with the first level L1 the structure 3 comprises means (not shown) for supporting the container 2, which container, in the illustrated embodiment, is constituted by a hopper positioned with its outlet 4 oriented downwards. A valve element 5 of a known kind is associated to the container 2, in proximity to its outlet 4, and is usable, as shall become readily apparent hereafter, to open or close the outlet 4 itself in order to allow or, respectively, prevent the exit of the incoherent material from the container 2 itself.

The first level L1 and a third level L3, overlying the second level L2 by a segment of determined length, are mutually connected by means of a hollow element or conduit 6, mechanically resistant and destined to contain a tubular sack 7 defining a transit channel for transferring the incoherent material from the container 2 to connecting means 8, extending to the lower level L2, which are able to convey the incoherent material itself towards a user unit schematically shown in the form of a block 9. The connecting means 8 essentially comprise a tubular element 8 presenting its inferior extremity 8a connected, with the interposition of a valve element 10, to the user unit 9 and its superior extremity 8b connected to the inferior extremity of the aforementioned tubular sack 7.

The superior extremity of the tubular sack 7 is connected in an air tight manner, in a way known in itself, to a superior area of the conduit 6 connectable in an air tight manner to the outlet 4 of the container 2, whilst the inferior extremity of the tubular sack 7 itself is connected in an air tight manner to the superior extremity of the tubular element 8. Hereafter, in the course of the description of the operation of the apparatus 1, the ways in which the tubular sack 7 is positioned aboard the apparatus 1 itself shall be explained.

As shown in FIG. 1 and as mentioned above, the aforesaid conduit 6 extends between the upper level L1 (outlet of the container 2) and the third level L3, which surpasses by a segment of determined length the level of the superior extremity of the tubular element 8. As a consequence thereof, and for reasons which will become readily apparent hereafter, an inferior portion, of relatively modest length, of the tubular sack 7 is not surrounded by the conduit 6.

The conduit 6 is defined by a plurality of tubular elements 11 with substantially cylindrical hollow shape, which are mutually coaxial and are positioned one after the other; such tubular element 11 are mutually connected in pairs, in correspondence with respective extremity portions, with the interposition, between each pair of tubular elements, of a closure or shut-off element 12 whose function shall become readily apparent hereafter. A closure element 12 is further connected to the inferior extremity of the tubular element 11 positioned inferiorly.

In particular, as shown in FIG. 1, the tubular element 8 presents its own superior extremity 8b connected to the inferior extremity of the aforementioned tubular sack 7 through a rapid fastening device 35, and between the closure element 12 and the tubular element 8 is interposed an external protecting sleeve 36.

Within the conduit 6, the aforementioned tubular element 11 and the closure elements 12 connected thereto are positioned in mutually coaxial fashion and extend along a vertical axis 13.

Figure 2:
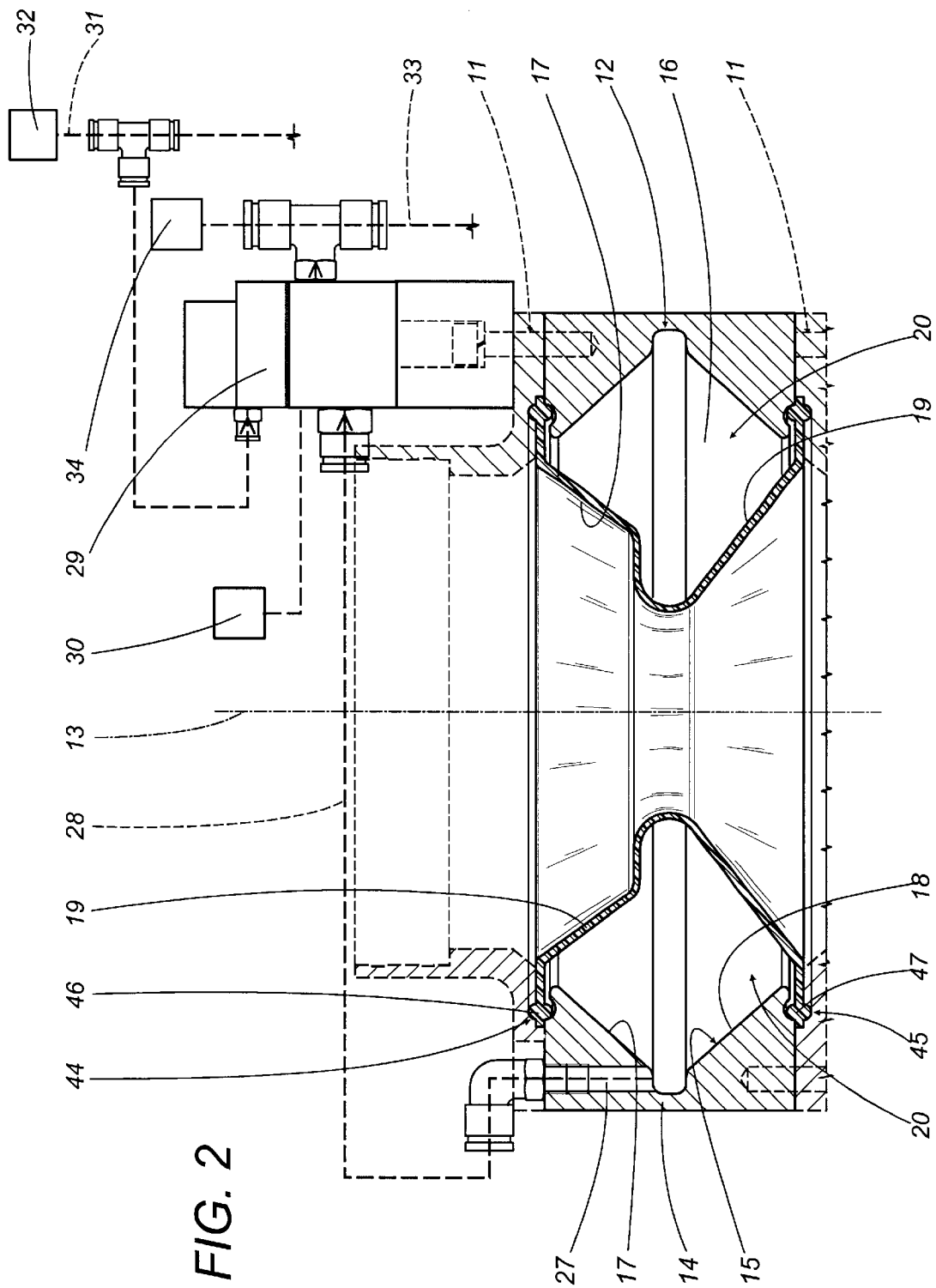
FIG. 2 shows a front view, with some parts sectioned and other parts removed, of some details relating to the embodiment of FIG. 1.
Figure 7:
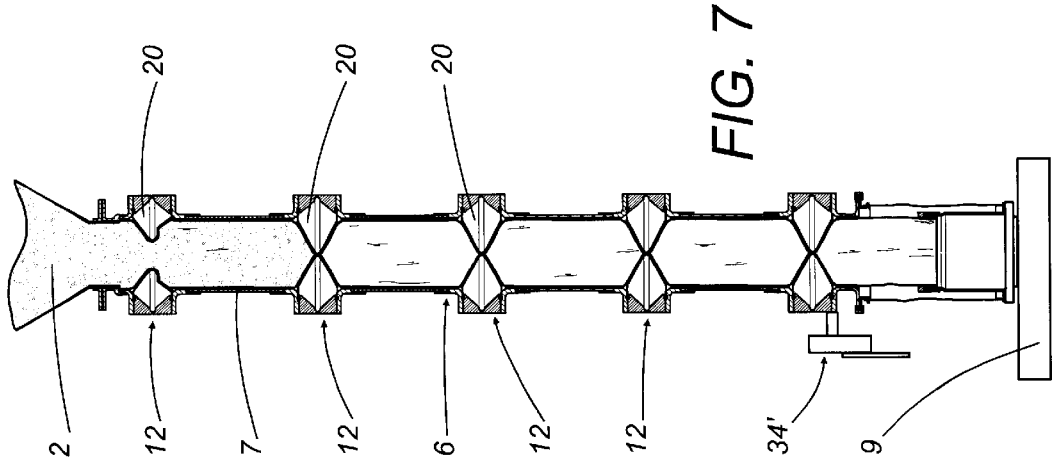
Figure 6:
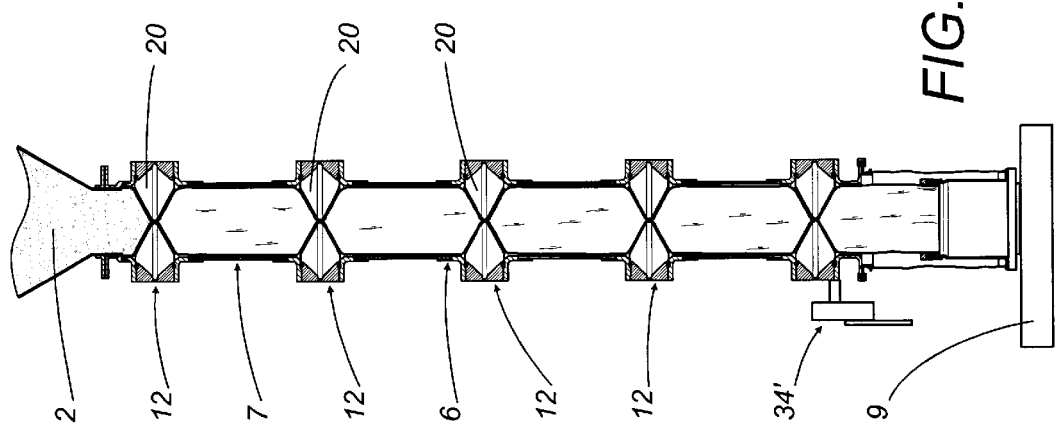

As shown, in particular, in FIG. 2, each closure element 12 essentially comprises a tubular element 14, internally delimited by a surface 15 defined by an annular recess 16 coaxial to the tubular element 14 itself. The annular recess 16, in the embodiment of the closure element 12 shown by way of example presents, if section with a diametrical plane, an angular shape defined by two sides 17 and 18 forming between them an angle substantially equal to 90° and inclined respectively by 45° and −45° with respect to the horizontal, but it could present any shape differing from the one shown herein (for instance an arched or polygonal shape). The corner defined by the intersection of the sides 17 and 18 is situated on the radially external peripheral, with respect to the axis 13, of the annular recess 16.

The radially interior annular edges 44 and 45 of each annular element 14 situated respectively inferiorly and superiorly are connected in an air tight manner to respective inferior and superior edge areas 46 and 47 of an elastically deformable element constituted by a membrane impermeable to air, made of elastic material and extending in annular shape about the axis 13. As a consequence thereof, each annular element 14 defines, together with the membrane 19 connected thereto, an annular chamber 20 developing about the axis 13.

As shown by way of example in FIG. 3, the membrane 19 can be defined by an annular wall 21 presenting, if sectioned with a diametrical plane, an arched shaped (for instance substantially semi-circular) with center (or centers) of curvature positioned radially external relative to the membrane 19 itself and with the inferior and superior edge areas 46 and 47, wherefrom the wall 21 originates.

As shown by way of example in FIG. 4, the membrane, indicated with the reference number 19', can instead comprise two equal walls 22 and 23 with the shape of an annulus, presenting the inferior and superior edge areas 46 and 47 and developing about the axis 13 with horizontal lay and positioned respectively inferiorly and superiorly with mutual distance substantially equal to the distance between the radially interior annular edges of the related annular element 14. The central holes 24 and 25 of the walls 22 and 23 are mutually joined in an air tight manner by an elastic sleeve 26 developing along the axis 13.

According to the embodiment shown in FIGS. 13 and 14 the membrane, indicated with the number 19", can comprise two equal walls 37 and 38 having the shape of an annulus, presenting the inferior and superior edge areas 46 and 47, and developing about the axis 13 with horizontal lay and positioned respectively inferiorly and superiorly with mutual distance substantially equal to the distance between the radially interior annular edges of the related annular element 14. The central holes 39 and 40 of the walls 37 and 38 are mutually joined in an air tight manner by an elastic sleeve 41 developing along the axis 13 and having a polygonal conformation, which in the embodiment shown in FIGS. 13 and 14 presents six sides. Moreover, as shown in FIG. 13, along the edge 42 of the respective central holes 39 and 40 are present substantially radial stiffening ribs 43. This embodiment allows a good opening and closure of the membrane 19" itself Each tubular element 14 is traversed by a hole 27, which places its chamber 20 in communication with a conduit 28 able to be connected, through a valve element 29 with electrical activation and under the control of an electrical unit known to those versed in the art and shown schematically in the form of a block 30, respectively with a compressed air supply line 31 (greater than atmospheric pressure), connected to a pump shown schematically in the form of a block 32, and with a line 33 connected to a suction pump schematically shown in the form of a block 34 and able to maintain within the line 33 itself a pressure lesser than atmospheric pressure.

When the chamber 20 of each closure element, in use and as described below, is placed in communication with the pump 32, the related membrane 19 (19'; 19") is expanded by the compressed air and its radially interior portion related to the axis 13 progressively approaches the axis 13 itself until it substantially determines a total obstruction of the related tubular element 14.

When the chamber 20 of each closure element is instead placed in communication with the pump 34, the related membrane 19 (19'; 19"), influenced by the lesser than atmospheric pressure existing inside the chamber 20 itself, goes to adhere onto the surface 15 of the related annular recess 16, giving rise to a situation of maximum opening of the related tubular element 14; in this situation, in practice, the passage section of the tubular element 14 is substantially equal to that of the tubular elements 11.

The aforementioned tubular sack 7 is bordered, in correspondence with its aforesaid inferior portion lying between the conduit 6 and the tubular element 8, by a sealing device constituted, for instance, by a binding device 34', of a kind known in itself, whose function shall become readily apparent hereafter.

The operation of the apparatus 1 shall now be described with reference in succession to the situations shown in FIGS. 5 through 12 and in FIG. 2.

When utilization of the apparatus 1 starts, the container 2 is situated in a position (not shown) distant from the apparatus 1, with the valve element 5 positioned in proximity to its outlet opening 4 closed.

In this phase (FIG. 5) the chambers 20 of all closure elements 12 communicate with the suction pump 34, and the membranes 19 (19'; 19") are all held, due to the vacuum existing in the related chambers 20, in contact with the surfaces 15 of the respective annular recesses 16.

A tubular sack 7 is introduced into the conduit 11, and its superior extremity is connected in air tight fashion to the aforementioned upper area of the conduit 11 connectable in air tight fashion to the outlet 4 of the container 2, whilst its inferior extremity is connected in air tight fashion to the superior extremity 8b of the tubular element 8.

At this point, after the container (2) has been connected to the superior extremity of the conduit 11 (FIG. 6 et seq.) the chambers 20 of all closure elements 12 are placed in communication with the pump 32 (FIG. 6), and the related membranes 19 (19'; 19"), under the effect of the pressure existing within the chambers 20 themselves, expand going to close the tubular sack 7 in correspondence with the respective contact areas with the tubular sack 7 itself.

The valve element 5 associated to the container 2 is then opened, and the chamber 20 associated to the superior closure element 12 is disconnected from the pump 32 and is placed in communication with the suction pump 34 (FIG. 7); as a consequence thereof, the membrane 19 (19'; 19") associated to the chamber 20 moves in contact with the surface 15 of the related annular recess 16, allowing the material coming from the container 2 to flow, through the tubular sack 7, to the area of action on the tubular sack 7 itself by the immediately underlying closure element 12.

As shown in FIGS. 8 through 11, the chambers 20 relating to the closure elements 12 positioned below the one just considered are thus placed in communication, in succession and at pre-determined moment, with the pump 34, so that the membranes 19 (19'; 19") associated to the chambers 20 themselves move in succession in contact with the surfaces 15 of the related annular recesses 16. As a consequence thereof, the material flows through the tubular sack 7 covering small successive gaps, whose length equals the distance that separates the various pairs of successive closure elements 12, and reaches the valve element 10 associated to the tubular element 8 without having undergone any large, sudden change in level.

The valve element 10 is then opened, and the material flows along the tubular sack 7, entering the user unit (9), without encountering any of the drawbacks described in the foreword to the present discussion, and in particular without the occurrence of phenomena whereby the material itself is de-mixed.

As shown in FIG. 1, when the material has ceased flowing along the tubular sack 7, the binding device 34' is activated to re-close, by binding, the inferior area of the tubular sack 7 itself.

The binding device 34' is then moved away from the tubular sack 7 (FIG. 12), and the tubular sack 7, after the closure of the valve elements 5 and 10 and after the removal of the container 2 from the structure 3, is extracted from above from conduit 11 without any dispersion of material into the environment.

Figure 5:
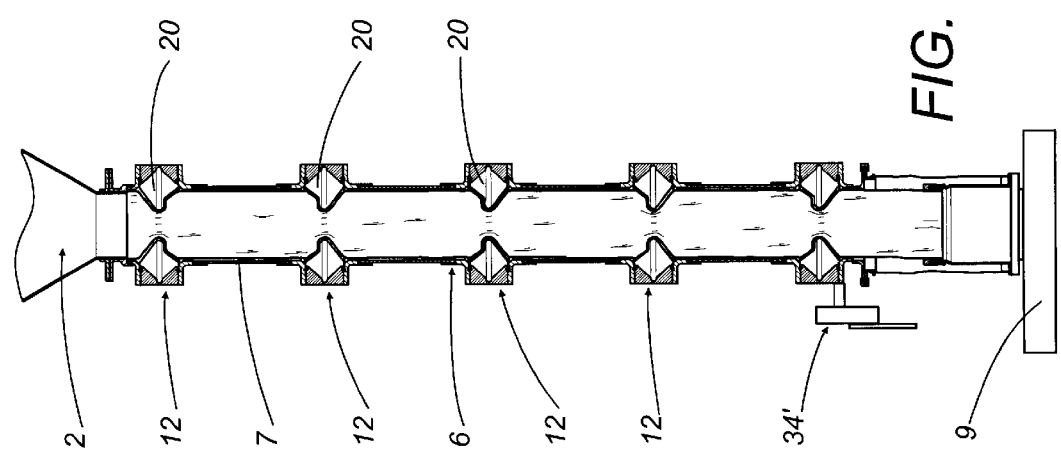
Figure 10:
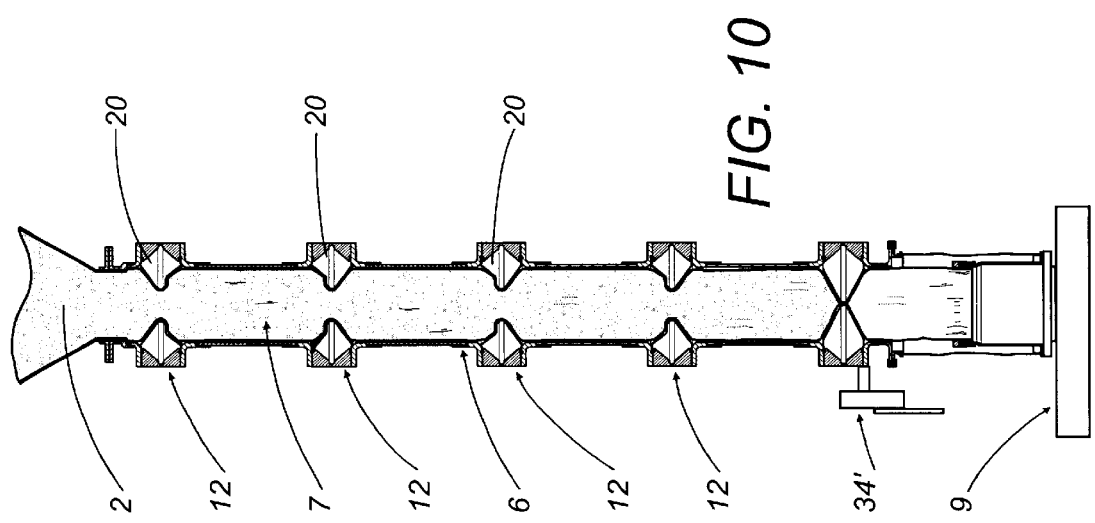
Figure 9:
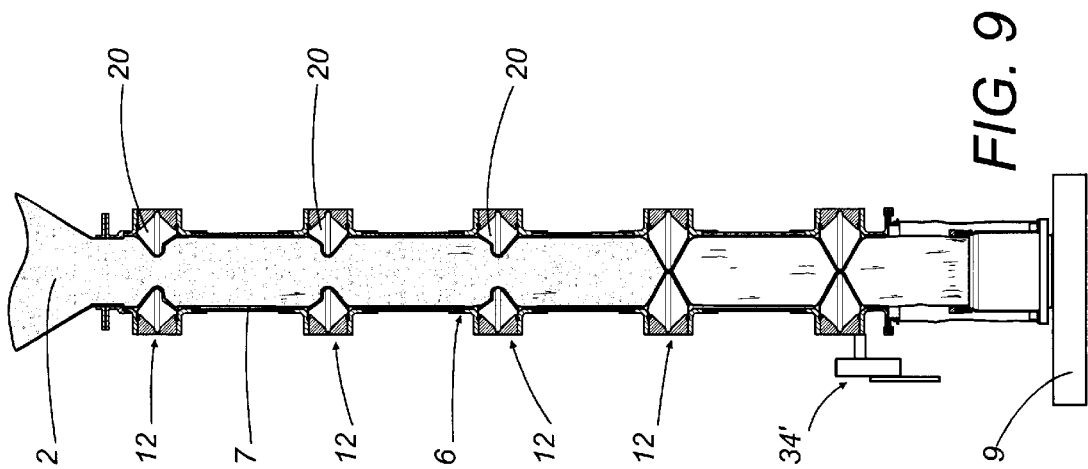
Figure 8:
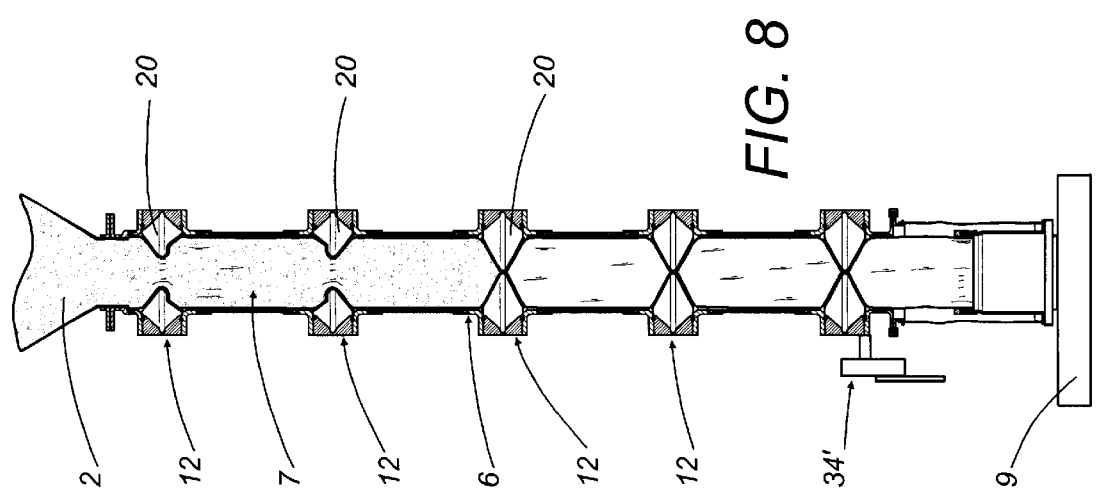

At this point the apparatus 1 has returned to the condition shown in FIG. 5 and, for the conveyance of new material towards the user unit 9, material which may differ from that considered until now, the phases described above are repeated.

The invention thus conceived can be subject to numerous modifications and variations, without thereby departing from the scope of the inventive concept.

What is claimed is:

1. Method for off-loading incoherent material from a container, for dispensing the incoherent material itself towards a user unit positioned inferiorly to the container itself, comprising the phases of connecting an outlet of said container to a superior extremity of a conduit connected with the other extremity to said user unit; to said outlet being associated a valve element and to said conduit being associated a plurality of shut-off elements mutually distanced along the conduit itself and each able to vary the amplitude of the passage existing inside the conduit itself between a condition of closure of the passage and a condition of maximum opening; of placing all said shut-off elements in said closure condition; of causing the opening of said valve element; and of causing the progressive disposition of said shut-off elements, starting from the highest one and proceeding downward, from said closure condition to said condition of maximum opening.

2. Method according to claim 1, wherein said method comprises housing longitudinally in an interior of said conduit, at least partially, a tubular sack having a superior extremity, wherein said step of connecting said outlet of said container to a superior extremity of said conduit comprises placing said superior extremity of said tubular sack in communication with said outlet and placing an inferior extremity of said tubular sack in communication with said user unit.

3. Method according to claim 2, wherein said step of placing an inferior extremity of said tubular sack in communication with said user unit comprises placing an inferior portion of said tubular sack that is external to said conduit in communication with said user unit.

4. Method according to claim 3, further comprising operating sealing means upon completion of the flow of said material along said tubular sack to re-close said inferior portion of the tubular sack itself.

5. Method according to claim 4, wherein said step of re-closing said inferior portion of the tubular sack comprises binding said inferior portion of the tubular sack.

6. Method according to claim 1, further comprising operating a further valve element that is positioned in proximity to a terminal portion of said conduit to change from a closed condition to an opened condition whereby incoherent material in said conduit flows to said user unit from said conduit through said further valve element.

7. Method according to claim 1, wherein said step of causing the progressive disposition of said shut-off elements from said closure condition to said condition of maximum opening comprises, for each of said shut-off elements, using a pump to control a quantity of fluid located in a cavity defined by an elastically deformable element of said shut-off element that is connected to an internal portion of said conduit to cause a size variation of the elastically deformable element itself.

8. Method according to claim 7, wherein said step of using a pump to control a quantity of fluid located in a cavity defined by an elastically deformable element of each of said shut-off elements comprises using a pump to control a quantity of air located in said cavity.

9. Method according to claim 7, wherein said step of using a pump to control a quantity of fluid located in a cavity defined by an elastically deformable element of each of said shut-off elements comprises using a pump to generate, in different operative phases, respectively a pressure lower than atmospheric pressure and a pressure higher than atmospheric pressure.

10. Method according to claim 9, wherein said step of using a pump to control a quantity of fluid located in a cavity defined by an elastically deformable element of each of said shut-off elements comprises using a first pump able to generate a pressure lower than atmospheric pressure and using a second pump able to generate a pressure higher than atmospheric pressure.

* * * * *